July 9, 1946.  N. E. GADDINI  2,403,517
FRUIT HOLDER
Filed April 14, 1945    3 Sheets-Sheet 1

INVENTOR
N. E. Gaddini
BY
ATTORNEYS

July 9, 1946.  N. E. GADDINI  2,403,517
FRUIT HOLDER
Filed April 14, 1945  3 Sheets-Sheet 3

INVENTOR
N. E. Gaddini
BY
ATTORNEYS

Patented July 9, 1946

2,403,517

UNITED STATES PATENT OFFICE 2,403,517

FRUIT HOLDER

Norman E. Gaddini, Winters, Calif.

Application April 14, 1945, Serial No. 588,335

19 Claims. (Cl. 146—28)

1

The present invention relates in general to the art of automatic fruit machinery, and especially machinery of such character adapted to accomplish mechanical halving and pitting of stone fruit, such as peaches and apricots. The present invention is a continuation in part of application, Serial No. 533,548, filed May 1, 1944, which discloses a machine of the above type.

One object of this invention is to provide an individual fruit holder of novel construction adapted for use, in an automatic fruit machine, to firmly hold the fruit in a predetermined position for sequential operations thereon, which result in halving and pitting of the fruit; there being a number of said holders mounted on a conveyor which moves the same intermittently and step by step through separate stations at which different operations are performed on said fruit.

Another object of the invention is to provide a fruit holder, for the purpose described, which is arranged to be actuated at a predetermined station, and after the fruit has been cut down both sides and across the bottom, to cause separation of the fruit halves at the bottom and about the uncut top portion of said fruit as a hinge, whereby to maintain the fruit in proper position for engagement and ejection of the pit by a downwardly moving pit ejection rod at said station. The separation of the fruit halves at the bottom permits clean and unrestricted ejection of the pit from the fruit without tearing or bruising of the fruit halves.

A further object is to provide a fruit holder, as in the preceding paragraph, which is constructed so that it compensates, automatically, for variation in fruit sizes and effects on different size fruit a proportionately equal separation of the fruit halves preparatory to pit ejection, while maintaining the uncut top portion of the fruit as a hinge; such hinge being important as a means to hold the top of the fruit, together with the stem end of the pit, centered in the fruit holder. The compensating action of the holder is provided in order that the holding means on which the fruit is impaled will not tear or injure fruit of smaller sizes.

It is also an object of the present invention to provide a method of halving and pitting stone fruit which comprises the steps of firmly supporting the fruit from its opposite halves; subsequently cutting the fruit, inwardly to the pit, down opposite sides, and across the bottom; spreading the fruit halves apart at the bottom with the uncut top portion as a hinge; then ejecting the pit downwardly between said spread-apart halves,

2 and cutting the halves apart at said hinge; and finally removing the cut-apart fruit halves from the support.

A further object of the invention is to provide a useful and effective fruit holder for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
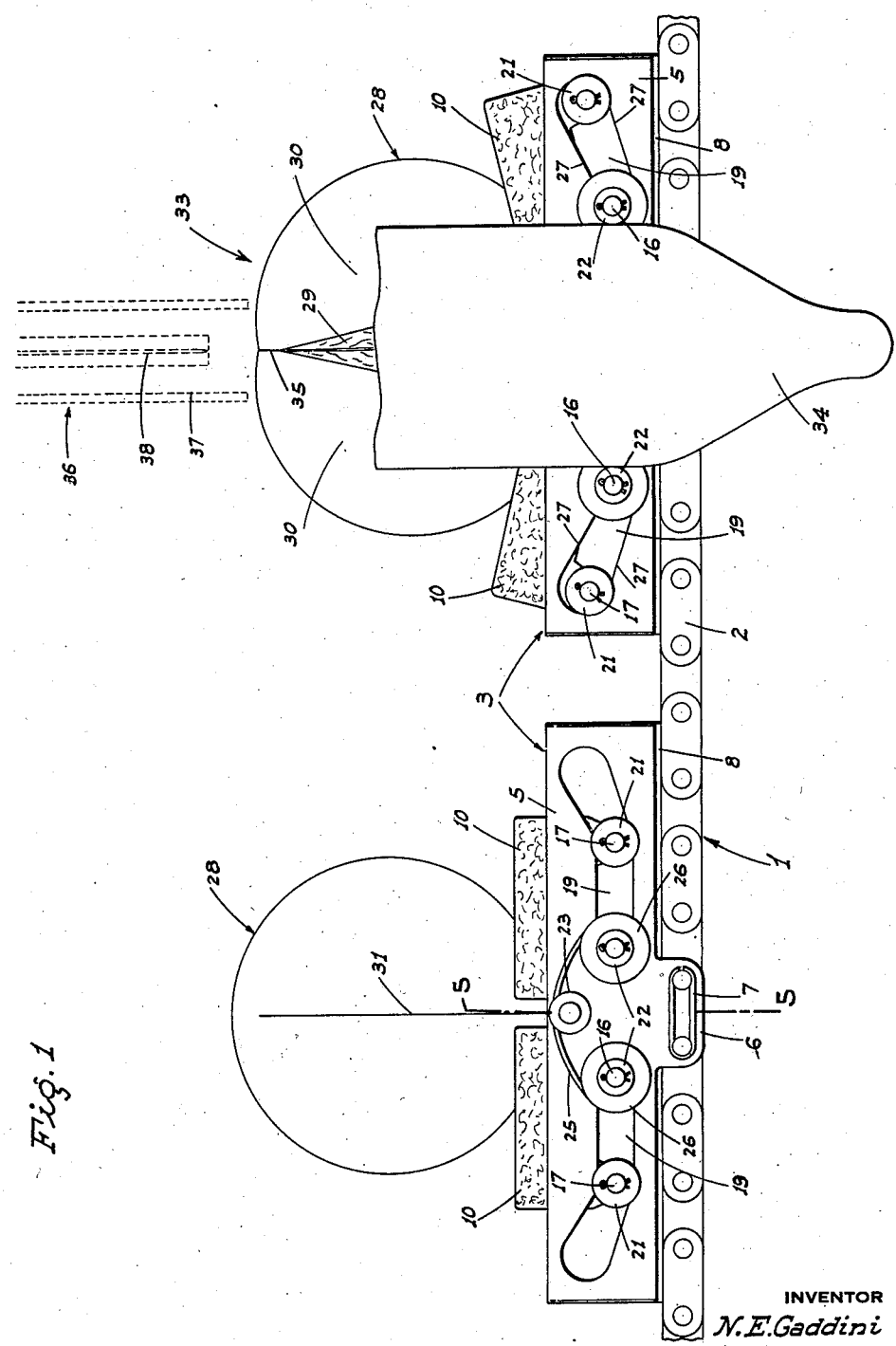
Figure 1 is a side elevation of a chain conveyor of an automatic fruit machine, illustrating a pair of the fruit holders as mounted on said chain conveyor.

Referring now more particularly to the characters of reference on the drawings, the numeral 1 indicates a chain conveyor including a pair of endless, transversely spaced chains 2 on which a plurality of separate fruit holders, indicated generally at 3, are secured in spaced end to end relation; the chain conveyor 1 being moved intermittently and step by step to successively position the fruit holders 3 at different stations in the automatic fruit machine for which the instant fruit holder is designed, and at which stations sequential operations are carried out on the supported fruit. Such a machine is disclosed in the above identified copending application for patent.

Each of the fruit holders 3 comprises the following structural arrangement:

A rectangular box frame 4, open top and bottom, is disposed above and extends between the chains 2 of chain conveyor 1, said box including flat sides 5 having depending attachment ears 6 formed integral therewith centrally of the ends of said frame. The attachment ears replace one of the side plates of the chain and are secured in connection with the latter by clasps 7. At their lower edges the sides 5 of frame 4 include laterally inwardly disposed, downwardly depending full-length stabilizing rails 8 which ride on top of the chain rollers to prevent teetering of the fruit holders.

A pair of transversely extending base plates 9 are disposed in the holder between the sides 5 thereof; said base plates being spaced apart slightly in the direction of travel and parallel transversely of the holder. The base plates are normally horizontal and alined in the manner shown in Fig. 2.

Each base plate 9 is provided, on its upper surface, with a relatively thick pad 10 of sponge rubber or the like, said pads being formed at adjacent ends with complementary or matching cupped seats 11, each seat including large and small diameter portions, as shown, for supporting engagement with fruit of corresponding sizes. Pairs of transversely spaced vertical spikes 12 are secured in connection with the base plates 9 near the adjacent edges thereof, said spikes projecting upwardly through the cupped seats 11 and being disposed in substantially equally spaced symmetrical relation to each other. At their lower ends the spikes 12 engage in sockets 13 in an increased-thickness portion of the base plates 9, and the spikes are retained in said sockets by set screws 14. For small size fruit, such as apricots, the spikes 12 may be removed from the sockets 13 and shorter spikes placed in other and more closely spaced sockets 15; the set screws 14 being arranged to cooperate with spikes in either set of sockets.

At their upper ends the spikes 12 are bevel sharpened, with the bevel facing centrally inwardly for the purpose of preventing fruit pits from impaling on said spikes and assuring that the pits engage between the latter, as will hereinafter appear.

The base plates 9 are each supported, from below, by a pair of transversely extending, longitudinally spaced parallel cross shafts 16 and 17; said cross shafts, adjacent the ends of the plates, extending through bearings 18 formed on and depending from said plates. The sides 5 of the frame 4 are formed, adjacent opposite ends of each plate 9, with elongated cam slots 19, there being flanged rollers 20 and 21 on the shafts 16 and 17, respectively, riding in said cam slots 19. The rollers 20 have axially outwardly projecting roller extensions 22 thereon for the purpose which hereinafter appears.

Figure 2:
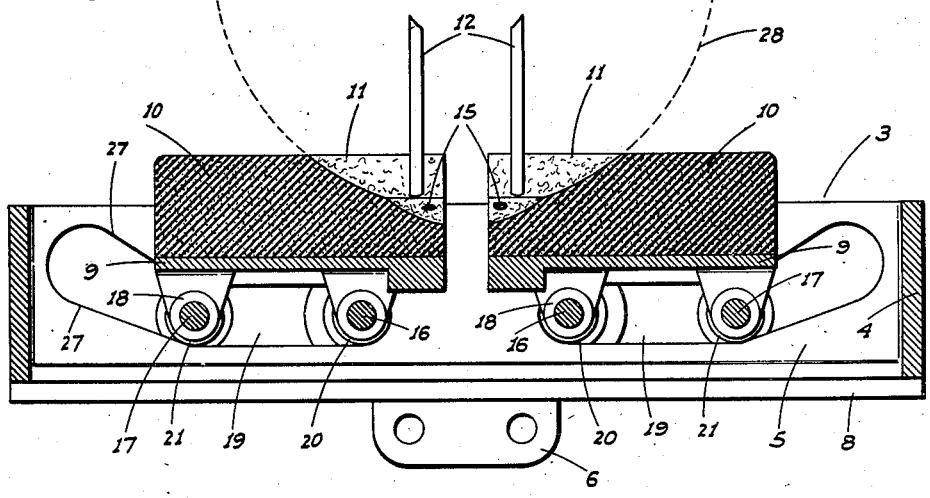
Figure 2 is an enlarged longitudinal sectional elevation of one of the holders with a large size fruit engaged thereby, and before separation of the fruit halves.

Exteriorly thereof and between the corresponding cam slots 19, each side 5 is fitted with a spool 23 on which an opposed leg, coil spring 24 is disposed, the legs 25 extending from the spool in opposite directions and engaging with enlarged pulley-like guides 26 on the rollers 20 between the latter and the roller extensions 22. The action of the spring legs 25 is to cause the rollers 20 to normally move toward and engage in adjacent ends of the cam slots 19, whereby the base plates 9 are then in the horizontal and adjacent position as shown in Fig. 2.

Adjacent end portions of the cam slots 19 are straight and horizontal, and the rollers 20 engage therein with an easy running but relatively close fit. The opposite or outer end portions of the cam slots 19 incline upwardly and are progressively increased in height toward the outer end, whereby the upper edges 27 of said outer end portions of the cam slots 19 diverge upwardly relative to the corresponding lower edges 27. It will thus be seen that when the rollers 21 ride into the outer end portions of the cam slots 19, considerable vertical play is possible, and which play is important for the reason which will hereinafter appear.

When an automatic fruit machine embodying the above described holders is in operation, said holders move intermittently and step by step through several different predetermined stations. At one station individual fruit 28, with the stem end uppermost, and with the suture facing laterally, is impaled on the spikes 12 with the pit 29 of the fruit disposed centrally of said spikes. The fruit engages on and is supported by the cupped seats 11; the spikes 12 corresponding to one base plate projecting into one fruit half 30, while the spikes 12 corresponding to the other base plate project into the other fruit half.

At successive steps the fruit is cut to the pit down opposite sides, as at 31, and across the bottom, as at 32. After the fruit is so cut, the holder 3 moves to a pit ejecting station, indicated generally at 33. The side and bottom cutting of the fruit, together with movement of each holder through the successive stations is described in some detail in the above identified copending application.

After the holder 3 reaches the pit ejecting station 33 and stops at such station, a pair of transversely spaced, downwardly projecting tongue-like cams 34 engage between corresponding roller extensions 22 which are moved apart by continuing downward movement of said cams, the latter functioning in exact predetermined timed relation to movement of the holder 3 to position at the station 28. As the roller extensions 22 are moved apart equally in opposite directions, a corresponding movement is imparted to the base plates 9; the rollers then moving along the cam slots 19. Due to the shape of the cam slots 19 the rollers 21 elevate relative to the rollers 20, causing the base plates to tip upwardly at their outer edges at the same time that the separating movement thereof occurs. When the base plates are thus tilted the pairs of spikes 12 corresponding to said base plates move apart but assume an upwardly and inwardly converging position; such relative movement of the spikes separating the fruit halves 30 at the bottom with the uncut top portion 35 of the fruit then serving as a hinge to maintain the fruit centered in the holder. By reason of the above motion of the plates 9 and spikes 12 the fruit halves 30 are separated at the bottom and about the hinge 35 without any tearing or rupturing of the flesh of said fruit halves.

Figure 3:
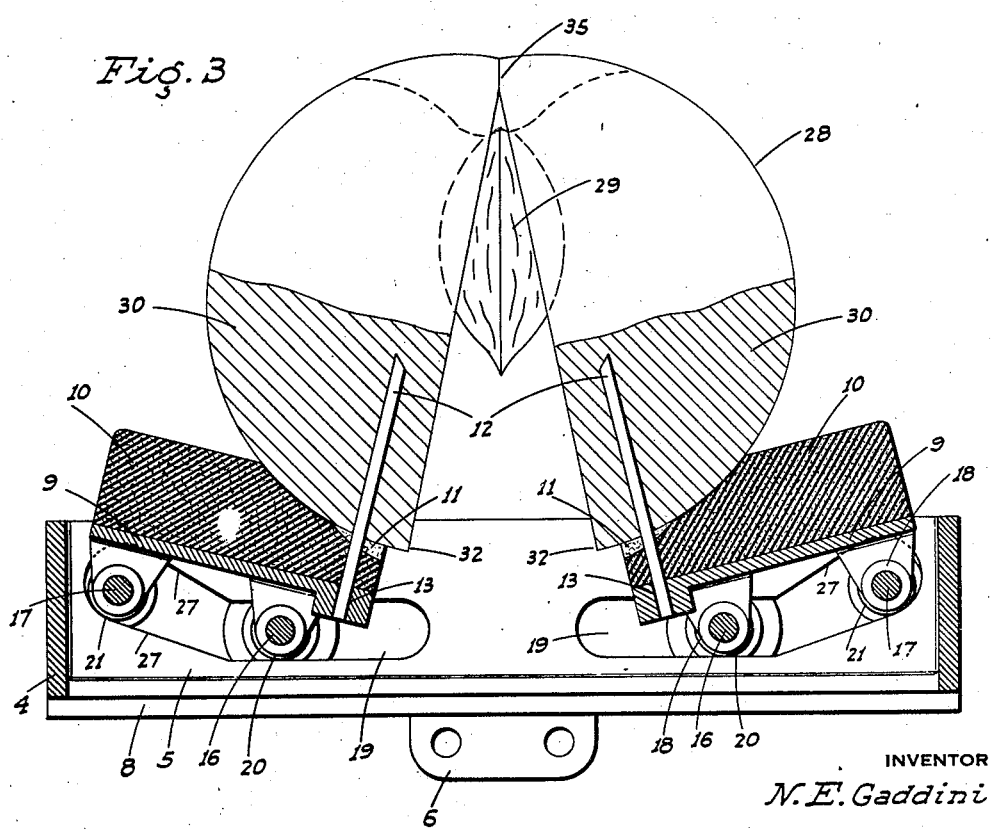
Figure 3 is a similar view but shows the position of the parts of the holder when the fruit halves are separated, but before ejection of the pit and cutting of the top hinge of the fruit.
Figure 4:
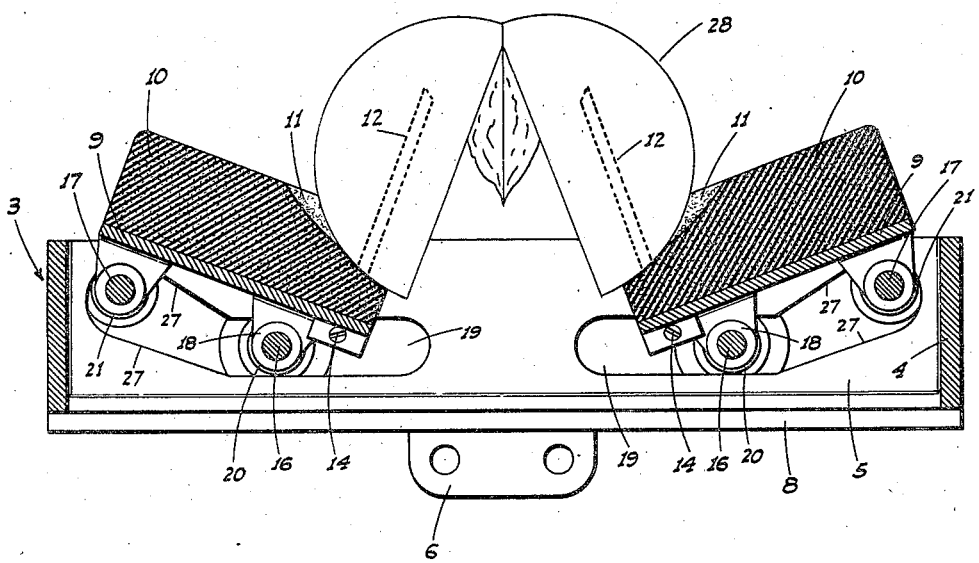
Figure 4 is a view similar to Fig. 3, but illustrates a smaller sized fruit engaged by the holder, and with the fruit halves spread apart.
Figure 5:
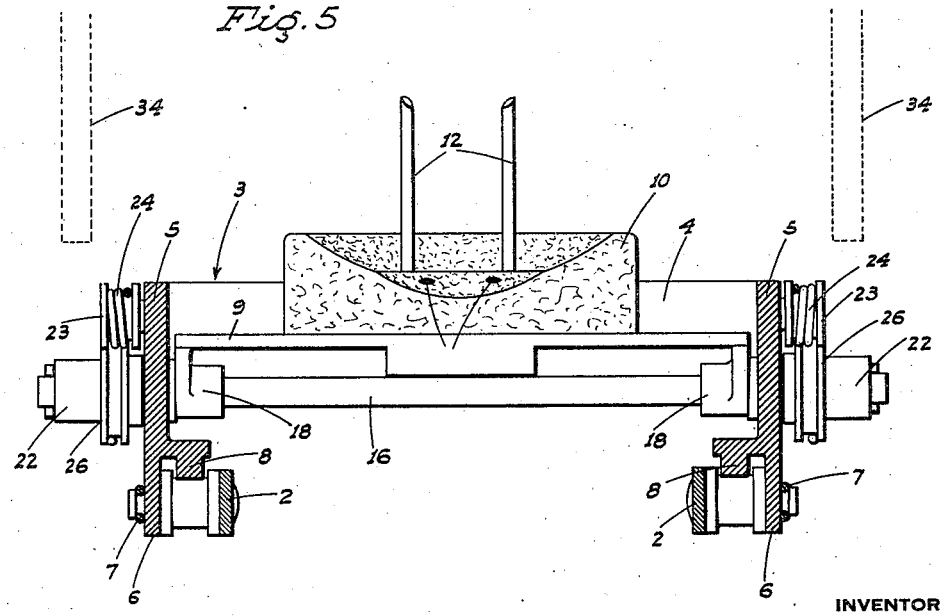
Figure 5 is a transverse section on line 5—5 of Fig. 1.

The holder compensates, automatically, in the above operation, for fruit of different sizes by reason of the fact that the rollers 21 then float vertically in the increased-width outer end portions of the cam slots 19. For a large size fruit the rollers 21 will ride the lower edges 27 of the cam slots, while for smaller size fruit the rollers 21 may ride the upper edges 27. By reason of this floating feature, the angle of convergence of the separate pairs of spikes 12 may vary, depending on the size of the fruit. Various size fruit remains hinged at its top uncut portion and is proportionately equally separated or opened at the bottom for a clean and unrestricted ejection of the pit, and which ejection is accomplished as follows:

With the base plates held apart by the cams 34, with resultant separating of the fruit halves, as shown in Fig. 3, for example, a pit ejecting unit, indicated generally at 36, moves downwardly from above, engaging the pit 29 and ejecting it downwardly from the fruit between the then bottom separated halves 30; the pit ejecting unit including pit confining rods 36, and a cutting blade arrangement 38 which cuts through the hinge 35 as the pit 29 is ejected. The halves 30 are thus separated from each other. The cam 34 and the pit ejecting unit 36 then lifts free of the holder 3 and the latter moves forwardly to another station where the separate halves 30 are removed from said holder for subsequent processing.

Under certain conditions it may be necessary to alter the throw or relative movement of the base plates 9, and the angle of convergence of the spikes 12. In machines where such alteration may be necessary, the sides 5 of the frame 4 will be separate and removable, whereby other sides having cam slots 19 of a different configuration may be substituted.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful and upon which Letters Patent is desired:

1. A fruit holder for automatic fruit machinery, said holder comprising a frame, a pair of adjacent supports mounted on the frame for separating movement, means to separate the supports, and fruit impaling means upstanding from and projecting above the supports in adjacent but spaced relation.

2. A fruit holder for automatic fruit machinery, said holder comprising a frame, a pair of adjacent supports mounted on the frame for separating movement, means to separate the supports, and fruit impaling means upstanding from the supports in adjacent but spaced relation; said supports having fruit engaging cushion pads on top thereof, and the fruit impaling means extending through said pads.

3. A fruit holder for automatic fruit machinery, said holder comprising a frame, a pair of adjacent supports mounted on the frame for separating movement, means to separate the supports, and fruit impaling means upstanding from and projecting above the supports in adjacent but spaced relation; said fruit impaling means comprising a pair of transversely spaced spikes upstanding from each support, the pairs of spikes being alined in the direction of said separating movement of the supports.

4. A fruit holder as in claim 3 in which the spikes are bevel sharpened at the upper end, with the bevels facing symmetrically inwardly.

5. A fruit holder for automatic fruit machinery, said holder comprising a frame, a pair of adjacent supports mounted on the frame for separating movement and for tilting movement toward each other, means operative to separate and tilt said supports, and fruit impaling elements upstanding from and projecting above the supports in adjacent but spaced relation.

6. A fruit holder for automatic fruit machinery, said holder comprising a frame, a pair of adjacent supports mounted on the frame for separating movement and for tilting movement toward each other, means operative to separate and tilt said supports, and fruit impaling elements upstanding from and projecting above the supports in adjacent but spaced relation; the supports normally being in adjacent-non-tilted position, and the fruit impaling elements of corresponding supports then being parallel, said elements converging upwardly when the supports are tilted.

7. A fruit holder for automatic fruit machinery, said holder comprising a frame, a pair of adjacent supports mounted on the frame for separating movement and for tilting movement toward each other, means operative to separate and tilt said supports, and fruit impaling elements upstanding from and projecting above the supports in adjacent but spaced relation; the fruit impaling elements of corresponding supports converging upwardly when the latter are tilted, said supports then having loose play in the tilting direction.

8. A fruit holder for automatic fruit machinery, said holder comprising a frame, a pair of adjacent supports mounted on the frame for separating movement, means to separate the supports, and fruit impaling means upstanding from the supports in adjacent but spaced relation; said supports each including a roller at one end thereof, and the frame having a corresponding longitudinal slot in which said roller rides.

9. A fruit holder for automatic fruit machinery, said holder comprising a frame, a pair of adjacent supports mounted on the frame for separating movement, means to separate the supports, and fruit impaling means upstanding from the supports in adjacent but spaced relation; said supports each including a roller at one end thereof, and the frame having a corresponding longitudinal cam slot in which the roller rides, such cam slot having a configuration to cause the corresponding support to tilt toward the other support when said supports are separated.

10. A fruit holder for automatic fruit machinery, said holder comprising a frame having spaced sides, a pair of transverse plates extending between the frame sides in adjacent parallel relation to each other, means mounting the plates in connection with the frame for separating movement lengthwise of the frame and for tilting movement toward each other, means to separate the plates, means to simultaneously tilt the same, and fruit impaling elements mounted in upstanding position on the plates in adjacent but spaced relation.

11. A fruit holder for automatic fruit machinery, said holder comprising a frame having spaced sides, a pair of transverse plates extending between the frame sides in adjacent parallel relation to each other, means mounting the plates in connection with the frame for separating movement lengthwise of the frame and for tilting movement toward each other, means to separate the plates, means to simultaneously tilt the same, and fruit impaling elements mounted in upstanding position on the plates in adjacent but spaced relation; there being cushion pads on top of the plates for fruit engagement and the impaling means being spikes projecting through said pads.

12. A fruit holder for automatic fruit machinery, said holder comprising a frame having spaced sides, a pair of transverse plates extending between the frame sides in adjacent parallel relation to each other, means mounting the plates in connection with the frame for separating movement lengthwise of the frame and for tilting movement toward each other, means to separate the plates, means to simultaneously tilt the same, and fruit impaling elements mounted in upstanding position on the plates in adjacent but spaced relation; said plate mounting means comprising a pair of spaced rollers on opposite ends of each plate, the sides of the frame having corresponding cam slots in which the rollers ride, the plate tilting means being inclined end portions of said cam slots, one of the corresponding rollers riding in said inclined slot portion when the plates separate.

13. A fruit holder as in claim 12 in which the inclined end portion of each slot increases in width toward its outer end, whereby said one corresponding roller has progressively increasing loose play vertically in said inclined end portion so that the corresponding plate has similar loose play in a tilting direction.

14. A fruit holder for automatic fruit machinery, said holder comprising a frame having spaced sides, a pair of transverse plates extending between the frame sides in adjacent parallel relation to each other, a pair of horizontally spaced rollers mounted on and projecting beyond opposite ends of the plates, cam slots in adjacent sides of the frame and in which slots the rollers ride, outer end portions of the slots being inclined upwardly, one roller of each pair being positioned to ride up the inclined portion of the corresponding slot upon separating movement of the plates whereby said plates are automatically tilted toward each other, means to separate the plates, and fruit impaling elements mounted in upstanding position on the plates in adjacent but spaced relation.

15. A fruit holder for automatic fruit machinery, said holder comprising a frame having spaced sides, a pair of transverse plates extending between the frame sides in adjacent parallel relation to each other, a pair of horizontally spaced rollers mounted on and projecting beyond opposite ends of the plates, cam slots in adjacent sides of the frame and in which slots the rollers side, outer end portions of the slots being inclined upwardly, one roller of each pair being positioned to ride up the inclined portion of the corresponding slot upon separating movement of the plates whereby said plates are automatically tilted toward each other, means to separate the plates, and fruit impaling elements mounted in upstanding position on the plates in adjacent but spaced relation; said inclined portions of each slot progressively increasing in width toward its outer end so that said one roller has progressively increasing loose play vertically therein resulting in similar loose play of the corresponding plate in a tilting direction.

16. A fruit holder for automatic fruit machinery, said holder comprising a frame having spaced sides, a pair of transverse plates extending between the frame sides in adjacent parallel relation to each other, a pair of horizontally spaced rollers mounted on and projecting beyond opposite ends of the plates, cam slots in adjacent sides of the frame and in which slots the rollers ride, outer end portions of the slots being inclined upwardly, one roller of each pair being positioned to ride up the inclined portion of the corresponding slot upon separating movement of the plates whereby said plates are automatically tilted toward each other, means to separate the plates, and fruit impaling elements mounted in upstanding position on the plates in adjacent but spaced relation; said plate separating means including extensions projecting outwardly from corresponding rollers on said plates at one end of the latter, said extensions being adapted to be cam separated.

17. A fruit holder as in claim 10 including spring means tending to return the plates to an adjacent non-tilted position.

18. A fruit holder for automatic fruit machinery, said holder comprising a frame, a pair of upwardly facing plates disposed in adjacent side by side relation, cushion pads on top of the plates for fruit engagement, fruit impaling elements upstanding from the plates in adjacent but spaced relation, and means to separate said plates and tilt the same toward each other when separated.

19. A method of halving and pitting fruit comprising the steps of firmly supporting the fruit, cutting the fruit along opposite sides and across the bottom, spreading the fruit halves apart at the bottom with the uncut top portion as a hinge, then ejecting the pit from the fruit between said spaced-apart halves, and cutting the halves apart at said hinge.

NORMAN E. GADDINI.